United States Patent
Noh

(10) Patent No.: US 9,896,090 B2
(45) Date of Patent: Feb. 20, 2018

(54) REMOTE PARKING CONTROL SYSTEM AND CONTROL METHOD THEREOF

(71) Applicant: MANDO CORPORATION, Pyeongtaek-si, Gyeonggi-do (KR)

(72) Inventor: Tae Bong Noh, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 148 days.

(21) Appl. No.: 15/098,260

(22) Filed: Apr. 13, 2016

(65) Prior Publication Data

US 2016/0304087 A1   Oct. 20, 2016

(30) Foreign Application Priority Data

Apr. 15, 2015   (KR) .................. 10-2015-0053275

(51) Int. Cl.
| G06D 1/00 | (2006.01) |
| G05D 3/00 | (2006.01) |
| G06F 17/00 | (2006.01) |
| G06F 7/00 | (2006.01) |
| B60W 30/06 | (2006.01) |
| B60R 25/24 | (2013.01) |

(52) U.S. Cl.
CPC ............. *B60W 30/06* (2013.01); *B60R 25/24* (2013.01)

(58) Field of Classification Search
None
See application file for complete search history.

(56) References Cited

FOREIGN PATENT DOCUMENTS

KR    10-2011-0114893 A    10/2011

*Primary Examiner* — Bhavesh V Amin
(74) *Attorney, Agent, or Firm* — Hauptman Ham, LLP

(57) ABSTRACT

A remote parking control system capable of displaying an operating state of a vehicle received from a vehicle controller to a smart device when a second authentication is completed through a pairing of the smart device in which a first authentication is completed through a pairing of the smart device and a smart key, and the vehicle controller, and a control method thereof are provided.

13 Claims, 5 Drawing Sheets

REMOTE PARKING CONTROL SYSTEM AND CONTROL METHOD THEREOF

CROSS-REFERENCE TO RELATED APPLICATION

This application claims priority to and the benefit of Korean Patent Application No. 10-2015-0053275, filed on Apr. 15, 2015, the disclosure of which is incorporated herein by reference in its entirety.

BACKGROUND

1. Field of the Invention

The present invention relates to a remote parking control system and a control method thereof, and more particularly, to a remote parking control system capable of displaying an operating state of a vehicle received from a vehicle controller to a smart device when a second authentication is completed through a pairing of the smart device in which a first authentication is completed through a pairing of the smart device and a smart key, and the vehicle controller, and a control method thereof.

2. Discussion of Related Art

An electronic control device substituting for a function such as a driving or a parking instead of a driver is widely being applied to a vehicle with developments of vehicle electronic technology.

Among them, a conventional parking support system has been a system controlling only a steering device instead of the driver, but is further being developed to have automatic braking/driving and gear transmission functions. Moreover, a remote parking system supporting a parking by remotely manipulating the vehicle through a device outside the vehicle without riding in the vehicle is being proposed.

The remote parking system is disclosed in various patent documents including Korean Patent Publication No. 10-2011-114893.

The conventional remote parking system including the patent remotely receives a parking signal by a remote control manipulation command of a driver, confirms a parking space in which a vehicle is able to be parked through an ultrasonic wave sensor and an obstacle determination unit, and controls the vehicle to be parked automatically, and thus improve convenience of the driver since remote driving and parking is possible without the driver.

However, the conventional remote parking system manipulates the vehicle through a remote device, that is, the smart key, capable of starting/pausing/stopping a parking support function of the vehicle, but has a limitation in which audio-visual information on a state of the vehicle while parking the vehicle is not provided.

Accordingly, while the vehicle is controlled to be parked, a smart device capable of monitoring information of the vehicle and a parking operating state, etc. is needed. Particularly, when connecting direct communication between a separate smart device and the vehicle, security vulnerability occurs since anyone can access the vehicle through his/her own smart device or another smart device, and thus the smart key and the smart device having enhanced security are required.

PRIOR ART DOCUMENT

Patent Document

Korean Patent Unexamined Publication No. 2011-114893 (Oct. 20, 2011) "Remote automatic parking system and control method thereof"

SUMMARY OF THE INVENTION

The present invention is directed to a remote parking control system capable of displaying an operating state of a vehicle received from a vehicle controller to a smart device when a second authentication is completed through a pairing of the smart device in which a first authentication is completed through a pairing of the smart device and a smart key, and the vehicle controller, and a control method thereof.

According to one aspect of the present invention, there is provided a remote parking control system controlling an automatic parking of a vehicle using a smart key which remotely transmits a parking signal to the vehicle, including: a vehicle controller configured to confirm a parking space in which the vehicle is able to be parked and control the vehicle to be automatically parked based on the parking signal of the smart key; and a smart device configured to communicate with each of the smart key and the vehicle controller, wherein the smart device performs a pairing with the smart key, and completes a first authentication of the smart key, and after the first authentication is completed, the smart device performs a pairing with the vehicle controller, completes a second authentication of the vehicle controller, and receives and displays an operating state of the vehicle according to a parking path generated for the parking of the vehicle.

The smart device may include: a button unit configured to request the pairing with the smart key, and request the pairing with the vehicle controller after the first authentication of the smart key is performed; and a display unit configured to display an authentication result with the smart key.

The display unit may display the operating state performing a parking control of the vehicle received from the vehicle controller, and peripheral image information acquired through a camera.

The smart device may further include an indicator indicating whether the pairing is completed when pairing with the smart key or the vehicle controller.

The display unit may include a soft key instructing at least one among a start, a pause, and a stop for the parking control of the vehicle.

The smart device may further include: a storage unit configured to store first identification information for an authentication of the smart key and second identification information for an authentication of the vehicle controller; a transmission unit configured to transmit a first request signal for the pairing to the smart key; a reception unit configured to receive third identification information which is previously stored in the smart key from the smart key in response to the first request signal; an authentication executor configured to compare the first identification information and the third identification information, and perform the first authentication between the smart device and the smart key based on the comparison result; and a display processing unit configured to display a first authentication result on the display unit when the first authentication of the smart key is normally completed.

The transmission unit may transmit a second request signal for the pairing to the vehicle controller when the first authentication is normally completed, the reception unit may receive fourth identification information which is previously stored in the vehicle controller from the vehicle controller in response to the second request signal, the authentication executor may compare the second identification information and the fourth identification information, and perform the second authentication between the smart device and the vehicle controller based on the comparison result, and the display processing unit may display a second authentication result on the display unit when the second authentication is normally completed.

According to another aspect of the present invention, there is provided a control method of a remote parking control system including a vehicle controller configured to confirm a parking space in which a vehicle is able to be parked and control the vehicle to be automatically parked based on a parking signal of a smart key which remotely transmits the parking signal to the vehicle; and a smart device configured to communicate with each of the smart key and the vehicle controller, the method including: performing a pairing with the smart key, and performing a first authentication of the smart key by the smart device; and after the first authentication of the smart key is completed, performing a pairing of the smart device and the vehicle controller, and performing a second authentication of the vehicle controller; and when the second authentication of the vehicle controller is completed, receiving and displaying an operating state of the vehicle according to a parking path generated for the parking of the vehicle.

First authentication information for an authentication of the smart key may be stored in the smart device, and the performing of the first authentication of the smart key may include: transmitting a first request signal for the pairing to the smart key by the smart device; when the smart key transmits third identification information of the smart key in response to the first request signal, receiving the third identification information by the smart device; and when the smart device compares the first identification information and the third identification information, normally completing the first authentication of the smart key when it is determined that the first identification information and the third identification information are identical.

Second identification information for an authentication of the vehicle controller may be stored in the smart device, and the performing of the second authentication of the vehicle controller may include: transmitting a second request signal for the pairing to the vehicle controller by smart device; when the vehicle controller transmits fourth identification information of the vehicle controller in response to the second request signal, receiving the fourth identification information by the smart device; and when the smart device compares the second identification information and the fourth identification information and determines that the second identification information and the fourth identification information are identical, normally completing the first authentication of the smart key.

The receiving and displaying of the operating state of the vehicle may include displaying a first authentication result on a display unit included in the smart device when the first authentication is completed.

The receiving and displaying of the operating state of the vehicle may include displaying a second authentication result on a display unit included in the smart device when the second authentication is completed.

The receiving and displaying of the operating state of the vehicle may include displaying an operating state performing a parking control of the vehicle received from the vehicle controller and peripheral image information acquired through a camera installed in the vehicle.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings.

Figure 1:
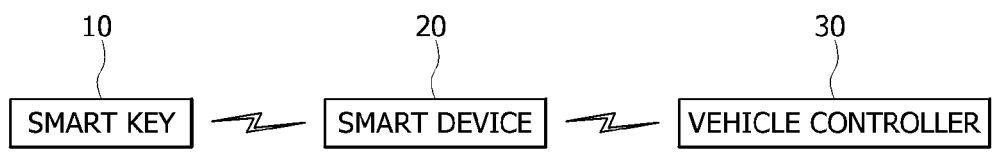
FIG. 1 is a block diagram illustrating a remote parking control system according to an embodiment of the present invention.

FIG. 1 is a block diagram illustrating a remote parking control system according to an embodiment of the present invention.

Referring to FIG. 1, a remote parking control system may include a vehicle controller 30 confirming a parking space in which a vehicle is able to be parked according to a parking signal of a smart key 10 which remotely transmits the parking signal to the vehicle, and controlling the vehicle to be parked automatically, and a smart device 20 normally performing an authentication on each of the smart key 10 and the vehicle controller 30 between the smart key 10 and the vehicle controller 30, and displaying an operating state of the vehicle received from the vehicle controller 30.

The smart key 10 may previously store unique identification information, for example, a serial number, a pin code, and encrypted password information.

The smart key 10 may include buttons for instructing a stop, a pause, or a stop for parking control of the vehicle. The smart key 10 may further include a button for a start of the vehicle in addition to the buttons for the parking control.

The smart key 10 may perform communication with the smart device 20 described above.

Figure 5:
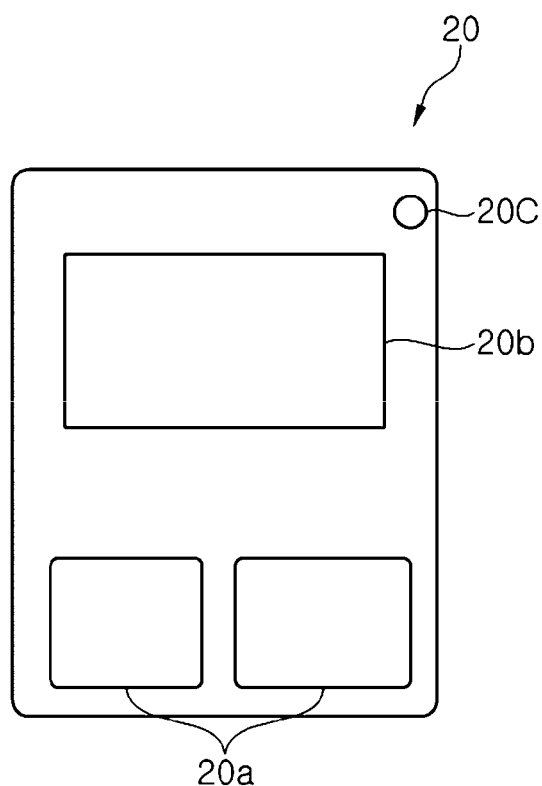
FIG. 5 is a diagram illustrating a screen of the smart device shown in FIG. 1.

The smart device 20 may include a button 20a for requesting a pairing of the smart device 20 and the smart key 10, and a button 20a for requesting a pairing of the smart device 20 and the vehicle controller 30, as shown in FIG. 5. Here, an example in which the button for each of the smart key 10 and the vehicle controller 30 is included is illustrated, but the pairing may be requested to the vehicle controller 30 by pushing one button again after requesting the pairing to the smart key 10 by including the one button and pushing once the one button.

Further, the smart device 20 may include a display unit 20b displaying a first authentication result after performing the pairing with the smart key 10, a second authentication result after performing the pairing with the vehicle controller 30, and an operating state of the vehicle received from the vehicle controller 30 when a normal authentication of the smart key 10 is completed and a normal authentication of the vehicle controller 30 is completed.

Further, the smart device 20 may further include an indicator 20c displaying a connection state with the smart key 10 or the vehicle controller 30. The smart device 20 may periodically check a distance between the smart key 10 and the smart device 20 and a distance between the smart device 20 and the vehicle controller 30 since the pairing is possible when the smart device 20 is located within a predetermined distance for a strength of a signal and continuity of communication, and display connection or disconnection of the pairing on the indicator 20c.

Meanwhile, first identification information and second identification information for the authentication of each of the smart key 10 and the vehicle controller 30 may be stored in the smart device 20, and a detailed description thereof will be described hereinafter.

The smart device 20 having the configuration described above may transmit a first request signal to the smart key 10 for the pairing with the smart key 10, the smart key 10 may transmit third identification information which is unique identification information of the smart key 10 to the smart device 20 in response to the first request signal, and the smart device 20 receiving the third identification information may determine whether the first identification information and the third identification information are identical by comparing the first identification information and the third identification information. Based on the comparison result, when it is determined that the first identification information and the third identification information are identical, a first authentication of the smart key 10 may be normally completed. When the first authentication is normally completed, the smart device 20 may display notification information indicating that a first pairing is normally completed on the display unit 20b, and when the first authentication is abnormally completed, the smart device 20 may display notification information instructing that the communication state between the smart key 10 and the smart device 20 is to be checked.

The smart device 20 in which the first authentication is normally completed may transmit a second request signal to the vehicle controller 30 for the pairing with the vehicle controller 30, and the vehicle controller 30 may transmit unique identification information of the vehicle controller 30, that is, fourth identification information, to the smart device 20 in response to the second request signal. The smart device may determine whether the second identification information and the fourth identification information are identical by comparing the second identification information and the fourth identification information. Based on the comparison result, when it is determined that the second identification information and the fourth identification information are identical, a second authentication of the vehicle controller 30 may be normally completed. When the second authentication is normally completed, the smart device 20 may display notification information indicating that a second pairing is normally completed on the display unit 20b.

Meanwhile, when the second authentication is abnormally completed, the smart device 20 may check a communication connection state between the smart device 20 and the vehicle controller 30, and output a control signal for emergency stop of all functions of the vehicle which are being operated when the communication is in the connection state, and perform the pairing with the smart key 10 when the communication between the smart device 20 and the vehicle controller 30 is not in the connection state.

The vehicle controller 30 may transmit the operating state of the vehicle which is being operated according to a parking path generated for the parking of the vehicle parking to the smart device 20. Here, the vehicle controller 30 may be a smart parking assist system (SPAS) electronic control unit (ECU) (hereinafter, it may be referred to as "SPAS electronic control unit").

Figure 2:
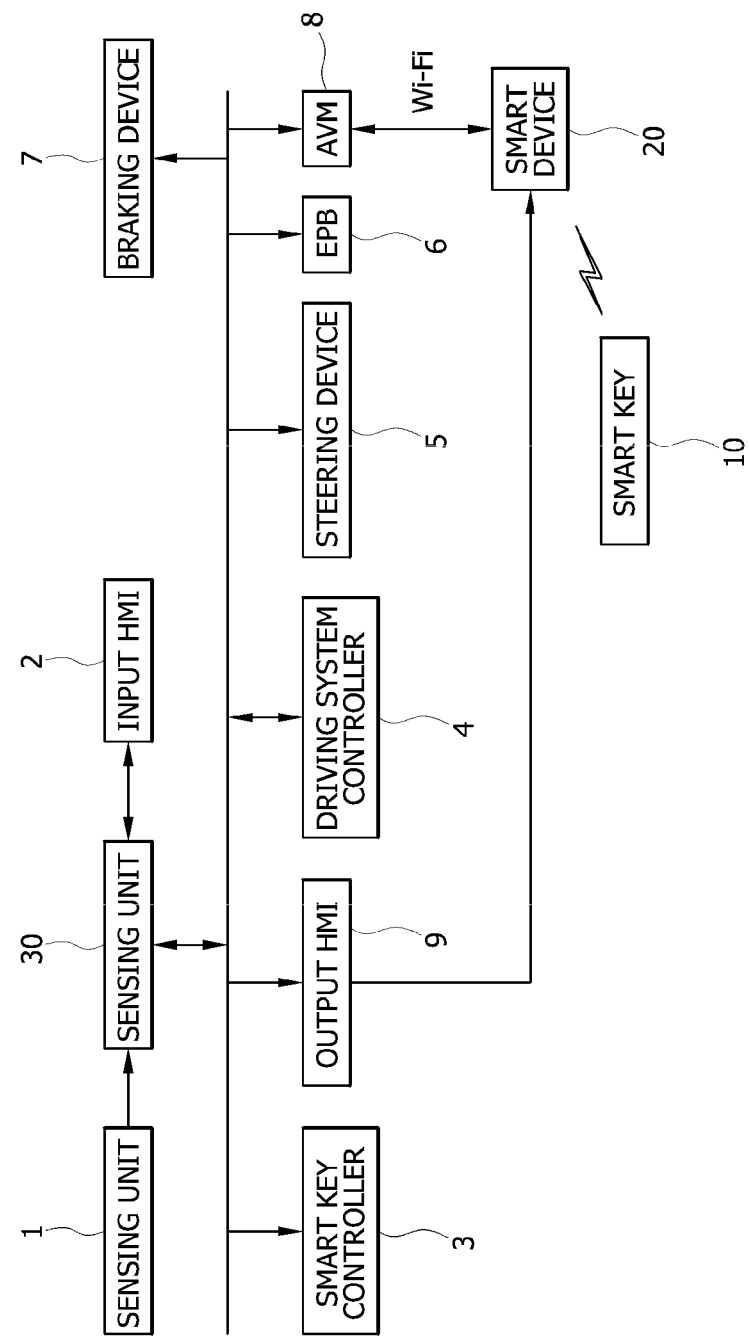
FIG. 2 is a detailed block diagram illustrating the remote parking control system shown in FIG. 1.

A remote parking control system according to an embodiment of the present invention will be described in detail below with reference to FIG. 2.

The remote parking control system according to an embodiment of the present invention may include a sensing unit 1 for measuring a distance to an obstacle of a parking space, a human machine interface (HMI) 2 for inputting request information of a driver needed for controlling the parking of the vehicle, a smart key controller 3 for controlling a function of the vehicle operating according to a signal received from the smart key 10, an SPAS electronic control unit 30 for performing the parking control so that the vehicle is parked in the parking space, a driving system controller 4 for controlling the driving according to a steering or braking control signal generated in the SPAS electronic control unit 30, a steering device 5 for controlling a steering, an electronic parking brake (EPB) 6, a braking device 7 for controlling a brake, an all around view monitoring (AVM) 8 installed in the vehicle and for acquiring an image around the vehicle, and an output HMI 9 for allowing the smart device 20 to display the operating state of the vehicle output from the SPAS electronic control unit 30.

The sensing unit 1 described above may be an ultrasonic wave sensor, the output HMI 9 related to the present invention may output the operating state of the vehicle output from the SPAS electronic control unit 30 to the smart device 20 through a wireless communication method. Further, the smart device 20 may receive the image around the vehicle through the AVM 8, and display the image on the display unit 20b. In this case, the AVM 8 and the smart device 20 may be connected through wireless-fidelity (Wi-Fi), but the present invention is not limited thereto, and the AVM 8 and the smart device 20 may be connected through any communication method capable of communicating at a near distance wirelessly.

As described above, firstly, the smart device 20 may perform the second authentication through the pairing with the SPAS electronic control unit 30 after the first authentication is normally completed through the pairing with the smart key 10. Secondly, the smart device 20 may perform a strong authentication by reconfirming the unique identification information registered in an actual vehicle and the unique identification information stored in the smart device 20 even when the first authentication on the smart key 10 is performed. Accordingly, the security may be strengthened since the access through the smart device having the unique identification information different from the unique identification information registered in the vehicle is not permitted when directly connecting the communication between the vehicles.

The smart device 20 may store the same unique identification information as that stored in the smart key 10 and the vehicle controller 30. Here, the unique identification information may be a serial number of the smart key 10, a pin code which is randomly generated, or encrypted password information. Accordingly, the normal authentication may not be performed when the pairing is performed to the smart device 20 having the unique identification information different from that of the smart key 10.

Figure 3:
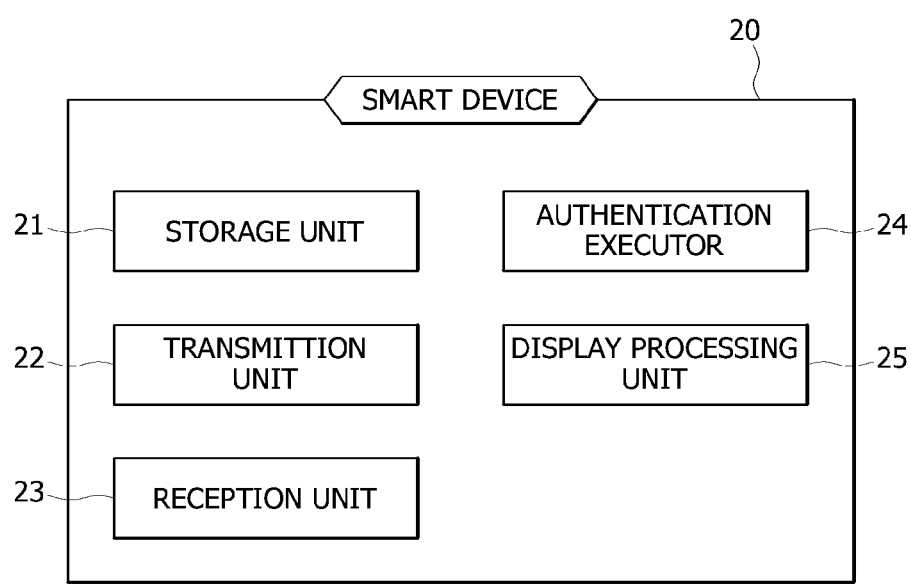
FIG. 3 is a block diagram illustrating a smart device shown in FIG. 1.

Referring to FIG. 3, the smart device 20 described above may include a storage unit 21, a transmission unit 22, a reception unit 23, an authentication executor 24, and a display processing unit 25.

The storage unit 21 may store the first identification information and the second identification information which are the same unique identification information as that of the smart key 10 and the vehicle controller 30.

The transmission unit 22 may transmit the first request signal to the smart key 10 in order to perform the pairing with the smart key 10. In this case, the first request signal may be a request signal requesting the unique identification information, that is, the second identification information, to the smart key 10.

Wireless communication technology between the smart key 10 and the smart device 20 may be limited to a Bluetooth pairing, but may be any wireless communication technology capable of performing the pairing. Also, any wireless communication technology may be applied to the pairing of the smart device 20 and the vehicle controller 30.

The smart key 10 may extract the third identification information which is the unique identification information which is previously stored in the smart key 10 in response to the first request signal transmitted from the smart device 20, and transmit the third identification information to the smart device 20 through the wireless communication method.

The reception unit 23 may receive the third identification information which is the unique identification information transmitted from the smart key 10.

The authentication executor 24 may determine whether the third identification information which is the unique identification information received by the reception unit 23 and the first identification information which is the unique identification information stored in the storage unit 21 are identical by comparing the third identification information and the first identification information, and when the third identification information and the first identification information are identical, the pairing of the smart key 10 and the smart device 20 may be normally performed, and the first authentication may be completed. When the third identification information and the first identification information are not identical, the authentication executor 24 may provide an authentication result indicating an authentication failure between the smart key 10 and the smart device 20.

The display processing unit 25 may display the authentication result performed by the authentication executor 24 on the display unit 20b. In this case, the authentication result may be the notification information (for example, the first pairing completion) indicating that the first pairing is normally completed when the third identification information which is the unique identification information received from the reception unit 23 and the first identification information which is the unique identification information stored in the storage unit 21 are identical, or the notification information (for example, "Please check a communication state between a smart key and a smart device") indicating that the first pairing is abnormally completed when the third identification information and the first identification information are not identical.

The transmission unit 22 of the smart device 20 may transmit the second request signal to the vehicle controller 30 in order to perform the pairing with the vehicle controller 30 after the first pairing is normally completed.

The vehicle controller 30 may extract the fourth identification information which is the unique identification information which is previously stored in the vehicle controller 30 in response to the second request signal transmitted from the smart device 20, and transmit the fourth identification information to the smart device 20 through the wireless communication method.

The reception unit 23 may receive the fourth identification information which is the unique identification information transmitted from the vehicle controller 30.

The authentication executor 24 may determine whether the fourth identification information received by the reception unit 23 and the second identification information stored in the storage unit 21 are identical by comparing the fourth identification information and the second identification information, and when the fourth identification information and the second identification information are identical, the pairing of the smart device 20 and the vehicle controller 30 may be normally performed, and the second authentication may be completed. When the fourth identification information and the second identification information are not identical, the authentication executor 24 may provide an authentication result indicating an authentication failure between the smart device 20 and the vehicle controller 30.

The display processing unit 25 may display the authentication result performed by the authentication executor 24 on the display unit 20b. In this case, when the second identification information and the fourth identification information are identical, the authentication result may be the notification information (for example, the second pairing completion) indicating that the second pairing is normally performed, or when the second identification information and the fourth identification information are not identical, be the notification information (for example, "Please check a communication state between a smart device and a vehicle controller") indicating that the second pairing is abnormally performed.

A control method of the remote parking control system having the configuration described above will be described below with reference to FIG. 4.

Figure 4:
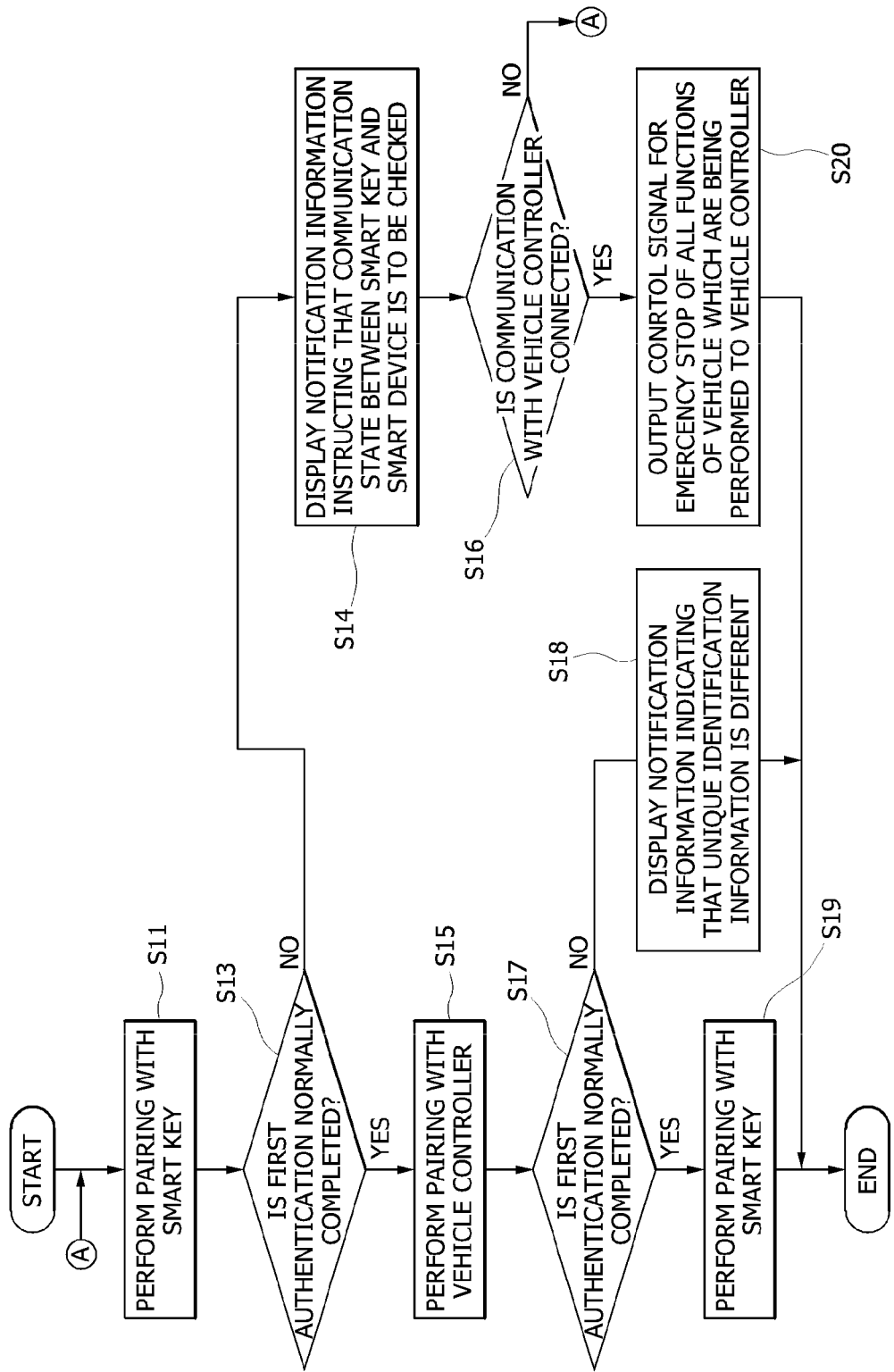
FIG. 4 is a flowchart for describing a control method of a remote parking control system according to an embodiment of the present invention.

FIG. 4 is a flowchart for describing a control method of a remote parking control system according to an embodiment of the present invention.

Referring to FIG. 4, the smart device 20 may perform the pairing with the smart key 10 (S11). In this case, when the button 20a included for requesting the pairing with the smart key 10 is selected, the smart device 20 may transmit the first request signal generated by the selected button to the smart key 10.

The smart device 20 may receive the third identification information described above in response to the first request signal transmitted from the smart key 10, and determine whether the first authentication is normally completed according to whether the third identification information and the first identification information which is the unique identification information stored in the storage unit 21 of the smart device 20 are identical (S13). That is, the smart device 20 may determine that the first authentication is normally completed when the third identification information received in response to the first request signal transmitted from the smart key 10 and the first identification information stored in the storage unit 21 of the smart device 20 are identical, and determine that the first authentication is abnormally completed when the third identification information and the first identification information are not identical.

Based on the determination result of the operation S13, when the first authentication is abnormally completed, the smart device 20 may display the notification information instructing that the communication state between the smart key 10 and the smart device 20 is to be checked on the display unit 20*b*.

Based on the determination result of the operation S13, when the first authentication is normally completed, the smart device 20 may perform the pairing with the vehicle controller 30 (S15). In this case, the smart device 20 may transmit the second request signal generated when the button included for requesting the pairing with the vehicle controller 30 is selected to the vehicle controller 30.

The smart device 20 may receive the fourth identification information which is the unique identification information which is previously stored in response to the second request signal transmitted from the vehicle controller 30, and determine whether the second authentication is normally completed according to whether the fourth identification information and the second identification information which is the unique identification information stored in the storage unit 21 of the smart device 20 are identical by comparing the fourth identification information and the second identification information (S17).

Based on the determination result of the operation S17, when the second authentication is abnormally completed, the smart device 20 may display the notification information indicating that the second identification information and the fourth identification information are not identical on the display unit 20*b* (S18).

Based on the determination result of the operation S17, when the second authentication is normally completed, the smart device 20 may receive and display the operating state of the vehicle received from the vehicle controller 30 (S19). Here, an example in which the operating state of the vehicle is received and displayed is described, but image information around the vehicle may be received and displayed in addition to the operating state of the vehicle.

The operating state of the vehicle may include the state information of the vehicle operated while automatically parking the vehicle.

Based on the determination result of the operation S13, when the first authentication is abnormally completed, the smart device 20 may determine whether the communication with the vehicle controller 30 is connected after displaying the notification information instructing that the communication state between the smart key 10 and the smart device 20 is to be checked through the operation S14 described above (S16).

Based on the determination result of the operation S16, when the communication with the vehicle controller 30 is not connected, the smart device 20 may perform the pairing with the smart key 10 by proceeding to the operation S11 described above.

Based on the determination result of the operation S16, when the communication with the vehicle controller 30 is connected, the smart device 20 may output the control signal for the emergency stop of all functions of the vehicle which are being operated to the vehicle controller 30 (S20). Accordingly, in a state in which the pairing of the smart key 10 and the smart device 20 is abnormally performed, the vehicle controller 30 may not be operated according to a manipulation signal applied to the smart device 20 even when the smart device 20 and the vehicle controller 30 are being in a state in which communication is available.

When the first authentication is normally completed when performing the pairing of the smart key 10 and the smart device 20 and the second authentication is normally completed when performing the pairing of the smart device 20 and the vehicle controller 30 after the first authentication is completed, the operating state of the vehicle received from the vehicle controller 30 may be displayed. In detail, the security on the remote communication may be secured by connecting the communication between the smart device 20 which is first authenticated through the pairing of the smart key 10 and the smart device 20 in which the security is maintained and the vehicle controller 30, and thus reliability on the remote parking support function may be increased by limiting an access authority to the vehicle except the driver.

According to an embodiment of the present invention, when the second authentication is completed through the pairing of the smart device in which the first authentication is completed through the pairing with the smart key, and the vehicle controller, the operating state of the vehicle received from the vehicle controller may be displayed on the smart device.

Also, according to an embodiment of the present invention, the pairing request with the smart key and the pairing request with the vehicle controller may be easily performed through the button unit included in the smart device.

Further, according to an embodiment of the present invention, a start, a pause, or a stop for the parking control of the vehicle may be instructed by the smart device while seeing the operating state of the vehicle displayed on the display unit by including a soft key instructing the start, the pause, or the stop for controlling the parking of the vehicle in the smart device.

Moreover, according to an embodiment of the present invention, the peripheral image information acquired by a camera installed in the vehicle may be conveniently confirmed through the smart device.

The above-described embodiments of the present invention are merely examples, and it should be apparent to those skilled in the art that various modifications can be made to the above-described embodiments of the present invention without departing from the spirit or the scope of the invention. The scope of the present invention is defined by the appended claims.

What is claimed is:

1. A remote parking control system controlling an automatic parking of a vehicle using a smart key which remotely transmits a parking signal to the vehicle, comprising:
    a vehicle controller configured to confirm a parking space in which the vehicle is able to be parked and control the vehicle to be automatically parked based on the parking signal of the smart key; and
    a smart device configured to communicate with each of the smart key and the vehicle controller,
    wherein the smart device performs a pairing with the smart key, and completes a first authentication of the smart key, and
    after the first authentication is completed, the smart device performs a pairing with the vehicle controller, completes a second authentication of the vehicle controller, and receives and displays an operating state of the vehicle according to a parking path generated for the parking of the vehicle.

2. The remote parking control system of claim 1, wherein the smart device comprises:
    a button unit configured to request the pairing with the smart key, and request the pairing with the vehicle controller after the first authentication of the smart key is performed; and
    a display unit configured to display an authentication result with the smart key.

3. The remote parking control system of claim 2, wherein the display unit displays the operating state performing a parking control of the vehicle received from the vehicle controller, and peripheral image information acquired through a camera.

4. The remote parking control system of claim 2, wherein the smart device further comprises:
an indicator indicating whether the pairing is completed when pairing with the smart key or the vehicle controller.

5. The remote parking control system of claim 3, wherein the display unit comprises a soft key instructing at least one among a start, a pause, and a stop for the parking control of the vehicle.

6. The remote parking control system of claim 3, wherein the smart device further comprises:
a storage unit configured to store first identification information for an authentication of the smart key and second identification information for an authentication of the vehicle controller;
a transmission unit configured to transmit a first request signal for the pairing to the smart key;
a reception unit configured to receive third identification information which is previously stored in the smart key from the smart key in response to the first request signal;
an authentication executor configured to compare the first identification information and the third identification information, and perform the first authentication between the smart device and the smart key based on the comparison result; and
a display processing unit configured to display a first authentication result on the display unit when the first authentication of the smart key is normally completed.

7. The remote parking control system of claim 6, wherein the transmission unit transmits a second request signal for the pairing to the vehicle controller when the first authentication is normally completed,
the reception unit receives fourth identification information which is previously stored in the vehicle controller from the vehicle controller in response to the second request signal,
the authentication executor compares the second identification information and the fourth identification information, and performs the second authentication between the smart device and the vehicle controller based on the comparison result, and
the display processing unit displays a second authentication result on the display unit when the second authentication is normally completed.

8. A control method of a remote parking control system including a vehicle controller configured to confirm a parking space in which a vehicle is able to be parked and control the vehicle to be automatically parked based on a parking signal of a smart key which remotely transmits the parking signal to the vehicle; and a smart device configured to communicate with each of the smart key and the vehicle controller, the method comprising:
performing a pairing with the smart key, and performing a first authentication of the smart key by the smart device; and
after the first authentication of the smart key is completed, performing a pairing of the smart device and the vehicle controller, and performing a second authentication of the vehicle controller; and
when the second authentication of the vehicle controller is completed, receiving and displaying an operating state of the vehicle according to a parking path generated for the parking of the vehicle.

9. The control method of the remote parking control system of claim 8, wherein first authentication information for an authentication of the smart key is stored in the smart device, and
the performing of the first authentication of the smart key comprises:
transmitting a first request signal for the pairing to the smart key by the smart device;
when the smart key transmits third identification information of the smart key in response to the first request signal, receiving the third identification information by the smart device; and
when the smart device compares the first identification information and the third identification information, normally completing the first authentication of the smart key when it is determined that the first identification information and the third identification information are identical.

10. The control method of the remote parking control system of claim 9, wherein second identification information for an authentication of the vehicle controller is stored in the smart device, and
the performing of the second authentication of the vehicle controller comprises:
transmitting a second request signal for the pairing to the vehicle controller by smart device;
when the vehicle controller transmits fourth identification information of the vehicle controller in response to the second request signal, receiving the fourth identification information by the smart device; and
when the smart device compares the second identification information and the fourth identification information and determines that the second identification information and the fourth identification information are identical, normally completing the first authentication of the smart key.

11. The control method of the remote parking control system of claim 9, wherein the receiving and displaying of the operating state of the vehicle comprises:
displaying a first authentication result on a display unit included in the smart device when the first authentication is completed.

12. The control method of the remote parking control system of claim 10, wherein the receiving and displaying of the operating state of the vehicle comprises:
displaying a second authentication result on a display unit included in the smart device when the second authentication is completed.

13. The control method of the remote parking control system of claim 8, wherein the receiving and displaying of the operating state of the vehicle comprises:
displaying an operating state performing a parking control of the vehicle received from the vehicle controller and peripheral image information acquired through a camera installed in the vehicle.

* * * * *